United States Patent [19]

Franey

[11] Patent Number: 4,552,634

[45] Date of Patent: Nov. 12, 1985

[54] RADIATION HARDENED LIFT-OFF CORRECTION MEDIUM AND PROCESS OF MANUFACTURE

[75] Inventor: Terence E. Franey, Lexington, Ky.

[73] Assignee: International Business Machines Corporation, Armonk, N.Y.

[21] Appl. No.: 547,177

[22] Filed: Oct. 31, 1983

Related U.S. Application Data

[62] Division of Ser. No. 419,101, Sep. 16, 1982, Pat. No. 4,434,207.

[51] Int. Cl.[4] .......... C08J 3/28; C08L 33/08

[52] U.S. Cl. .......... 204/159.23; 204/159.19; 204/159.22

[58] Field of Search .......... 204/159.22, 159.15, 204/159.19, 159.23

[56] References Cited

U.S. PATENT DOCUMENTS

| | | | |
|---|---|---|---|
| 3,661,618 | 5/1972 | Brookman et al. | 427/208.4 |
| 3,754,966 | 8/1973 | Newman et al. | 428/512 |
| 3,770,490 | 11/1973 | Parker | 427/53.1 |
| 3,825,470 | 7/1974 | Elbert et al. | 428/474.4 |
| 3,881,942 | 5/1975 | Buckwalter | 204/159.15 |
| 3,926,639 | 12/1975 | Rosen et al. | 204/159.14 |
| 4,093,772 | 6/1978 | Taylor et al. | 428/346 |
| 4,100,045 | 7/1978 | Bogan et al. | 204/159.15 |
| 4,312,916 | 1/1982 | Kakumaru et al. | 428/355 |

FOREIGN PATENT DOCUMENTS

| | | |
|---|---|---|
| 2412037 | 5/1977 | Fed. Rep. of Germany . |
| 2006235 | 5/1979 | United Kingdom . |

OTHER PUBLICATIONS

*IBM Technical Disclosure Bulletin,* vol. 23, No. 123, May 1981, "Tackified Correctable Inks," by C. W. Anderson et al., at p. 5461.

*Primary Examiner*—Allan M. Lieberman
*Attorney, Agent, or Firm*—John A. Brady

[57] ABSTRACT

A formula and process to manufacture a lift-off correction ribbon in which the bonding material layer is cured by ultraviolet radiation. The bonding material is not normally tacky, but bonds under impact. The radiation curing eliminates solvents and their associated handling and pollution problems. The preferred bonding material formula is primarily a mixture of dilinoleic acid and trimethylol propane triacrylate with an ultraviolet ionization initiator.

13 Claims, 3 Drawing Figures

RADIATION HARDENED LIFT-OFF CORRECTION MEDIUM AND PROCESS OF MANUFACTURE

This application is a division of application Ser. No. 419,101, filed Sept. 16, 1982, now U.S. Pat. No. 4,434,207.

TECHNICAL FIELD

This invention relates to correction mediums for lift-off correction by impact. Printing suitable for lift-off correction is removed bodily after impact of the correction medium against printed characters. A bond with the correction medium forms. The correction medium is removed, and the print stays with the correction medium. Such lift-off correction employing adhesive is now generally well known in the art. The correction medium of this invention is not adhesive or tacky prior to impact. It is achieved by radiation hardening a mixture including polymerizable materials.

BACKGROUND ART

U.S. Pat. No. 3,825,470 to Elbert et al is illustrative of transfer mediums suited to lift-off correction. As there disclosed, the ink printed must be coherent as printed and be cohesive to itself in preference to the paper printed upon during the lift-off step. An element having an adhesive surface is impacted against a printed character to be eradicated and the element is pulled away.

Preferred embodiments of this invention employ a material in the correction medium whih is very similar chemically to a moiety of the body of the ink to be eradicated. A teaching employing such a mechansim in lift-off correction is in the *IBM Technical Disclosure Bulletin* article entitled"Tackified Correctable Inks," by C. W. Anderson and H. T. Findlay, Vol. 23, No. 12, May 1981, at page 5461. That teaches the addition of methyl ester of natural resin to the adhesive element and to the ink.

Radiation hardening of polymerizable polymers to form laminations is known in the art in various forms. U.S. Pat. No. 3,754,966 to Newman et al is illustrative. That patent is of particular interest because it discloses trimethylol propane triacrylate as a major polymerizable ingredient. That acrylate is a major ingredient of preferred embodiments of this invention. The patent, however, teaches a transfer medium, not a lift-off correction medium. This invention employs a polyacidic fatty acid as a major ingredient, an ingredient much different from the unsaturated polymers and polymerizable monomers employed as a second resin-forming ingredient in that patent.

Use of ultraviolet radiation to form lamination is a standard technique. U.S. Pat. No. 3,770,490 to Parker is illustrative. It is also of particular interest because it disclosed trimethylol propane triacrylate as a polymerizable ingredient. That patent is directed to container coatings and does not employ a polyacidic fatty acid as an ingredient.

The following patents specifically mention achieving adhesives for correction in which necessary adhesive properties for lift-off correction are produced at impact: German Pat. No. 24 12 037 published May 5, 1977; U.S. Pat. No. 4,093,772 to Taylor et al, and United Kingdom Pat. No. 2,006,235 published May 2, 1979. The German and United Kingdom patents disclose the use of acrylate resins, but not a triacrylate. The United Kingdom patent also discloses the use of dimer acids. The U.S. patent employs polyamide in the bonding layer which is the same polyamide as that used in commercial inks. This is said to provide good compatibility and adhesion. None employ ionizing radiation hardening.

An inherent and well recognized advantage of radiation hardening to obtain a final product is that no materials are expelled from the product which might find their way into the atmosphere and act as a pollutant. In a solvent-applied process, for example, solvent must be recovered to prevent it from going into the atmosphere and such recovery may be imperfect even when the most advanced and expensive recovery equipment is employed. The foregoing and other prior art known does not encompass a lift-off correction medium made by ionizing radiation hardening.

DISCLOSURE OF THE INVENTION

In accordance with this invention, a process is disclosed employing a formula to achieve a bonding material for lift-off correction by impact. The formula is cured by ionizing radiation, specifically by ultraviolet light in preferred embodiments. The finished bonding material is not tacky under normal use, but bonds to printed characters under impact. In its more typical forms, this invention comprises a thin, flexible supporting substrate carrying a thin layer of the bonding material. The uncured formula is coated on the substrate and passed under ionizing radiation to effect the curing.

The major ingredients of the formula are a triacrylate, specifically trimethylol propane triacrylate, and a polyacidic fatty acid. The substrate is a standard, commercially available resin film, specifically polyethylene terephthalate.

Most natural fatty acids occur in chain lengths of even numbers of carbon atoms. No basis appears restricting this invention to the natural acids, as distinguished from closely similar acids having uneven numbers of carbon atoms. Accordingly, the term "of the fatty acid type" should be understood as encompassing acids essentially similar to molecular structure to fatty acids, but not necessarily occurring in living organisms.

The correction element is typically rolled on itself in a spool to be unwound by the typewriter mechanisms during use. When wound in a spool, transfer of bonding material to the back of the adjoining substrate is to be avoided. Such transfer is sometimes known as offset. Material which is offset tends to obstruct feed mechanisms. That material also is not in place for use for correction.

The use of dilinoleic acid as the fatty acid with an ultraviolet curing has been found to have unique advantages in preferred embodiments in eliminating offset. Where offset is not important, dioleic acid, a closely similar acid is equally useful as the fatty acid. Electron-beam curing with the dilinoleic acid does not eliminate offset, indicating that a site on the dilinoleic acid is activated for chemical reaction with the acrylate by the electromagnetic radiation but not by electrons.

BEST MODE FOR CARRYING OUT THE INVENTION

The preferred embodiment is a correction ribbon to be used to lift-off and thereby eradicate printed characters and other symbols by bonding to them under impact. The ribbon has a 1.5 mil thick (approximately 0.00384 cm ) MYLAR polyethylene terephthalate film substrate (MYLAR is a trademark of E. I. DuPont de Nemours Co.). The second lamination of the preferred ribbon is a ½ mil thick (approximately 0.00128 cm) layer of bonding material. The ribbon has a regular cross section and may be of any width suitable to the printed apparatus with which it is to be used. The dimensions just stated were reached by optimizing the results for the relatively low energy impact of a daisy wheel printer. For a longer dwell and correspondingly higher energy of a conventional typewriter, the substrate may desirably be thickened and other optimizing adjustments may be desirable.

The bonding material provided by this invention is not tacky or otherwise sticky or adhesive under normal handling conditions. This permits feeding of the correction ribbon without providing for drag which would arise from being unwound and from some bonding material rubbed off on guide surfaces. The ribbon is normally wound in a spool and unwound by mechanism in the printer during use. The bonding material of this invention not only unwinds without drag from tackiness but does not experience offset of the bonding material to the back of the substrate as the ribbon is unrolled. Such offset is undesirable both because it introduces extraneous material which encounters guide surfaces of the ribbon feed and the impact element during correction and also because the offset bonding material is not in place to function for correction.

This invention was designed for the purpose of correcting printing for transfer ribbons of the type described in the previously mentioned U.S. Pat. No. 3,825,470 to Elbert et al. The major solid body material of the ink of that ribbon is EMEREZ 1533 polyamide ribbon (EMEREZ is a trademark of Emery Industries, Inc.). EMEREZ is understood to be a polyamide made from a dilinoleic acid moiety and a diamine moiety. The preferred embodiment employs dilinoleic acid held in a solid body of a polymerized acrylate. The dilinoleic acid was selected as being directly compatible with the closely similar moiety of the body material of the ink.

Figure 1:
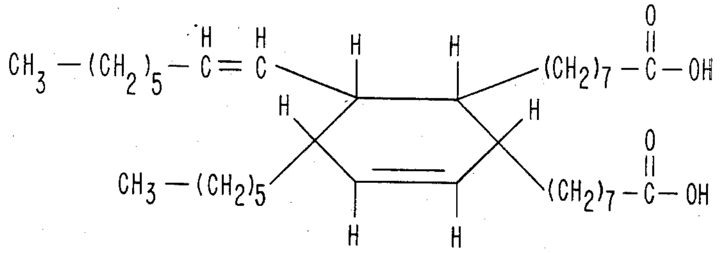
FIG. 1 is a structural diagram generally descriptive of dilinoleic acid.

FIG. 1 is a structural diagram of the primary form of dilinoleic acid. It should be understood, of course, that the unsaturated sites may vary somewhat in position on a small percentage of molecules and that closely similar molecules typically occur as impurities. Such molecules will function much like the dilinoleic acid with respect to this invention. The dilinoleic form has a special advantage in eliminating offset.

Dilinoleic acid is a product of the dimerization at unsaturated sites of two molecules of linoleic acid. Accordingly, it has 36 carbon atoms, two acid functional groups, and a six member ring of carbon molecules having one unsaturated bond.

Linoleic acid is, of course, a naturally occurring fatty acid. Dilinoleic acid is formed by a linoleic acid molecule having conjugation (two double bonds around one single bond) acting upon one double bond cite in another linoleic acid molecule. The double bond of the second molecule opens and carbons from each side of the conjugation become bonded to the first molecule. A single double bond remains in the former conjugation region, and that becomes the single double bond in the six member carbon ring.

In the primary form of dilinoleic acid as shown in FIG. 1, a double bond site exists attached to the six member ring on a chain other than those with the acid functional groups. That site appears to be necessary in the preferred embodiment to avoid a tendency to offset. It apparently reacts under ultraviolet radiation with the acrylate body material during curing of the element to extend the molecular bonding to the acrylate. This is not experienced when the radiation is electron beam. Where dioleic acid is used, which is structurally dilinoleic acid without the double bond outside the ring, it can be extracted with chloroform after curing. Similarly, dilinoleic acid is extracted by chloroform after electron beam curing. Much less dilinoleic acid is similarly extracted after ultraviolet curing.

Offset might also be avoided by presently known techniques, although at corresponding cost. A silicone back coating of the substrate is known to generally eliminate offset. Also, a separating powder, for example, talcum powder, on the bonding layer, is also generally effective.

The preferred formulas have been optimized for production using commercially available materials. For this reason, the dilinoleic acid used comprises only about 75% by weight dilinoleic acid. About 25% is a trilinoleic acid. That is the product of a conjugated linoleic acid molecule operating upon and forming a six member carbon ring as described with the remaining double bond site of a dilinoleic acid molecule. Such a triacid molecule appears generally equally useful for the eradicating bonding mechanism, but cannot be used in large proportion without offset beginning to appear.

Figure 2:
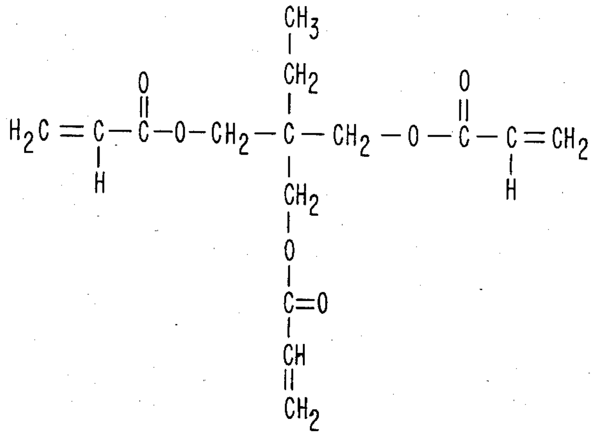
FIG. 2 is a structural diagram of trimethyol propane triacrylate.
Figure 3:
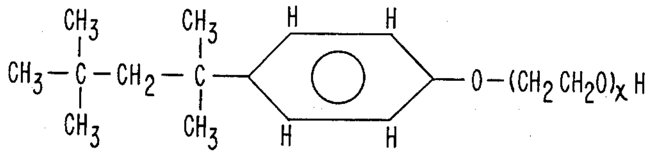
FIG. 3 is a structural diagram of octyl phenoxy polyethoxy ethanol.

FIG. 2 is a structural diagram of trimethylol propane triacrylate, the polyacrlate which is cured by radiation to form the resin body of the bonding material. The molecule has four straight chains, three of which carry a double bond site on the end which are the active sites for polymerization. Other basically different monomer molecules known would polymerize much slower than this triacrylate and are not considered practical alternatives. This triacrylate substituted to be methacrylate would be slowed in polymerization by steric factors but would probably function adequately. Certain oligomers possibly would function adequately if suitably diluted.

Other elements in the preferred formula are to initiate polymerization or to prevent separating during manufacture. The preferred bonding material in essence is a mixture of the fatty acid and the polyacrylate, specifically one part by weight dilinoleic acid to between 0.8 and 2.4 parts by weight trimethylol propane triacrylate. The preferred formula, which is optimized for bulk manufacture and use of the product with a daisy wheel printer, is as follows:

PREFERRED FORMULA

| Ingredient | Percent by Weight |
|---|---|
| EMPOL 1024 (Trademark of Emery Industries, Inc.) (75% by wt. dilinoleic acid; 25% by wt. trilinoleic acid) | 56.3 |
| Trimethylol propane triacrylate | 32.0 |
| Octylphenoxy polyethoxy ethanol (TRITON-X-100 Trademarked product of Rohm & Haas Co.) | 6.7 |
| Hexane diol diacrylate | 4.6 |

-continued

| PREFERRED FORMULA | |
|---|---|
| Ingredient | Percent by Weight |
| 2,2-Dimethoxy-2-phenylacetophenone | 2.5 |

In a laboratory setting with undiluted dilinoleic acid, ranges of good operability appear to be as follows:

| PREFERRED LABORATORY FORMULA | |
|---|---|
| Ingredient | Percent by Weight |
| Dilinoleic acid | 40–60 |
| Trimethylol propane triacrylate | 25–50 |
| Octylphenoxy polyethoxy ethanol (TRITRON-X-100, Trademarked product of Rohm & Haas Co.) | 4–8 |
| Hexane diol diacrylate | 3–7 |
| 2,2-Dimethoxy-2-phenylacetophenone | 1–5 |

The acetophenone is a powerful, well known, commercially available ultraviolet free-radical initiator. It is a solid. Other initiators except ones which react with the fatty acid, such as an amine, might be used.

The ethanol and the diacrylate are unnecessary except where uncured batches are to stand substantial times at room temperature. They contribute to compatibility and thereby prevent separation. Each used alone will prevent separation, but eradication by the product is then impaired. Used in roughly equal mixture, eradication is not impaired. The ethanol is, of course, a surfactant which has a non-polar tail which should act on the non-polar part of the other molecules. The diacrylate is primarily polar and should act on the polar area of the other molecules. (The acrylate also should polymerize with the other acrylate during curing, which should not significantly affect the characteristics of the solid produced.)

Two methods of avoiding use of the two compatibility agents are constant stirring and heating. Both are effective to keep the batch thoroughly mixed.

Where the correction ribbon is to be suitable for use at temperatures as high as 105° F. (about 26.3° C.), eradication using the foregoing formula is unsatisfactory. Subsequently, formulas for use in a broader temperature range were developed by the inventor of this application and a co-worker. The unsatisfactory results are remedied by raising the viscosity of the fluid material, the dilinoleic acid. Any viscosity-increasing additive should function well. Specifically, 10% by weight EMEREZ 1548 polyamide (EMEREZ is a trademark of Emery Industries, Inc.) is dissolved into the dilinoleic acid. The polyamide has a moiety of dilinoleic acid and is therefore very compatible. This increases the viscosity by a factor of 3.

The preferred formula using the viscosity-increasing EMEREZ 1548 is as follows:

| PREFERRED BROAD TEMPERATURE RANGE FORMULA | |
|---|---|
| Ingredient | Percent by Weight |
| EMPOL 1024 | 50.7 |
| EMEREZ 1548 | 5.6 |
| Trimethylol propane triacrylate | 32.0 |
| Octylphenoxy polyethoxy ethanol (TRITON-X-100) | 6.7 |
| Hexane diol diacrylate | 4.6 |
| 2,2-Dimethoxy-2-phenylacetophenone | 2.5 |

In general, a relatively high viscosity of the fatty acid part is significant to adequate eradication. No monoacid which functions adequately is known. The hydrogen bonds of the acid groups apparently are necessary to provide the viscosity. Esterification of the acids has destroyed adequate eradication.

Formulas as above described are thoroughly mixed. The acetophenone is a solid which dissolves well in the triacrylate. They are first mixed, and the acetophenone is dissolved. The other ingredients are then mixed in and stirred for about 15 minutes. When not in full solution, the mixture is cloudy from light diffraction. When in full solution, it is clear.

This solution is coated on a bulk roll of the polyethylene terephthalate film to the ½ mil (about 0.00128 cm) thickness, and then radiation cured. Shrinking is minimal and the final thickness after radiation curing is also substantially that of the coated thickness. The final result is a bonding layer on the polyester substrate. This is typically a bulk size which is slit by standard techniques to the width desired for use as a typewriter correction ribbon or correction element for a specific printer. The slit ribbon, comprising the bonding layer and the polyester substrate, is then wound onto a spool or otherwise packed as is appropriate for the specific typewriter or other printer for which it is to be used.

The radiation curing is by ultraviolet electromagnetic radiation. This is by a standard curing processor, with ultraviolet bulb, which applies 200 watts per inch across the width of the coated substrate. The curing zone is maintained in a nitrogen atmosphere because oxygen in the air interfers with cure. The flow rate found to be effective is 800 SCFH (standard cubit feet per hour, about 22.7 cubic meters per hour). The coated substrate is moved longitudinally at a rate of 25 feet (about 7.62 meters) per minute to assure full curing. Rates up to 100 feet (about 30.5 meters) per minute appear satisfactory. The essential curing mechanism is, of course, by free radical polymerization of the double bonds of the triacrylate.

Coating techniques may be conventional as the formula has the comparatively low viscosity generally in the range of 1200 to 3600 cps. It flows like a syrup. The coater may be a conventional three roll direct coater with smoothing bar. The coating thickness of ½ mil (about 0.00128 cm) is also not exceptionally thin or otherwise difficult to apply.

The final product is typically mounted in a typewriter generally like a second typewriter ribbon and is raised to the printing station only when a symbol previously printed is to be eradicated. The correction element has its bonding material toward the printing and is impacted on the opposite side of its substrate by the typing mechanism. Preferably, the same symbol element which printed the wrong character is impacted on the correction ribbon. If registration may be too uncertain, a wide area or "block" element may be used, which applies pressure over the whole area where the symbol to be erased may be. The symbol binds to the bonding material and the printer element moves the correction ribbon away, carrying the erased symbol with it.

Although this invention was developed with focus on eradicating of printing from a polyamide-containing ink as discussed above, it is believed to eradicate printing from other inks which are suitable for lift-off correction.

It will be apparent that various modifications and diluents employing the same basic formula may be applied within the spirit and scope of this invention. Accordingly, the following claims should measure the invention and should not be limited by any implication from the preferred forms and steps herein disclosed.

What is claimed is:

1. A material suitable for use as a bonding material under impact for lift-off correction of printing consisting essentially of the ionizing-radiation-cured product of the mixture of a triacrylate consisting essentially of acrylate moieties and an alkyl moiety and a polyacidic acid of the fatty-acid type having at least one unsaturated ring structure of carbon molecules.

2. The material as in claim 1 in which said polyacrylate is trimethylol propane triacrylate.

3. The material as in claim 1 in which said polyacidic acid comprises at least thirty carbon atoms having at least one unsaturated site in a six member ring structure of carbon molecules.

4. The material as in claim 2 in which said polyacidic acid comprises at least thirty carbon atoms having at least one unsaturated site in a six member ring structure of carbon molecules.

5. The material as in claim 3 in which said acid and said triacrylate are in the range of about 0.8 to 2.4 parts by weight of said acid to one part by weight of said triacrylate.

6. The material as in claim 4 in which said acid and said triacrylate are in the range of about 0.8 to 2.4 parts by weight of said acid to one part by weight of said triacrylate.

7. The material as in claim 3 in which said acid consists essentially of dilinoleic acid.

8. The material as in claim 4 in which said acid consists essentially of dilinoleic acid.

9. The material as in claim 5 in which said acid consists essentially of dilinoleic acid.

10. The material as in claim 6 in which said acid consists essentially of dilinoleic acid.

11. The material as in claim 9 wherein the composition from which the ionizing-radiation-cured product is prepared also comprises a diol diacrylate and an octyl polyethoxy ethanol, both providing compatibility prior to curing, and an ultraviolet initiator.

12. The material as in claim 10 wherein the composition from which the ionizing-radiation-cured product is prepared also comprises a diol diacrylate and an octyl polyethoxy ethanol, both providing compatability prior to curing, and an ultraviolet initiator.

13. The material as in claim 12 wherein the composition from which the ionizing-radiation-cured product is prepared comprises in the order of magnitude of 56 parts by weight of said acid, at least 42 parts by weight being said dilinoleic acid, 32 parts by weight of said trimethyol propane triacetate, 5 parts by weight of said diol diacrylate, 7 parts by weight of said polyethoxy ethanol, and 2.5 parts by weight of said initiator.

* * * * *